United States Patent Office 3,369,946
Patented Feb. 20, 1968

3,369,946
PROCESS FOR POLYMERIZING ACRYLIC MONOMERS WITH STRONTIUM PERCHLORATE FOR PYROTECHNICS AND PROPELLANTS
Bernard E. Douda, Bloomfield, Ind., assignor to the United States of America as represented by the Secretary of the Navy
No Drawing. Filed June 22, 1964, Ser. No. 377,140
4 Claims. (Cl. 149—83)

ABSTRACT OF THE DISCLOSURE

A process for preparing a polymer from a monomer selected from the class consisting of acrylic acid, methacrylic acid and esters of acrylic acid and methacrylic acid comprising dissolving water moistened strontium perchlorate in said monomer and then catalyzing the solution of moistened strontium perchlorate and monomer.

The invention described herein may be manufactured and used by or for the Government of the United States of America for governmental purposes without the payment of any royalties thereon or therefor.

The present invention relates to a process for polymerizing monomers and more particularly to a process for polymerizing acrylic monomers for use in pyrotechnic compositions.

Various processes are known in the prior art for polymerizing acrylic monomers. It is well-known that peroxides may be employed as catalysts. One of the most commonly used peroxide catalysts is benzoyl peroxide which yields high peak exothermic temperatures. However, if the process is not controlled, vaporous bubbles are evolved which remain as blobs in the polymerized substance when used with monomers such as methyl methacrylate. In U.S. Patent 2,616,878, which issued on Nov. 4, 1952, to Maurice Mention, 2-methyltetrahydrofurane is used to polymerize methyl methacrylate to give a clear limpid polymer free from bubbles. However, the disadvantage of the use of 2-methyltetrahydrofurane is that about a thirteen hours curing cycle is required.

Various tertiary amines, such as N,N-dimethylaniline, N,N-dimethyl-p-toluidine, and trihexylamine are also used with benzoyl peroxide to promote the polymerization of methyl methacrylate. However, these tertiary amines are not oxidizing agents and therefore do not impart combustibility to the polymer. While noncombustibility is often desirable in commercial applications, it is not desirable in some military applications such as pyrotechnics and propellants.

In the present invention, strontium perchlorate containing up to about 4 percent of water is used to prepolymerize the acrylic monomer with complete polymerization being effected at a later time by the addition of a catalyst. The strontium perchlorate will dissolve in the acrylic monomer with the degree of solubility being related to the amount of moisture added to the strontium perchlorate. As increasing amounts of strontium perchlorate are dissolved in the acrylic monomer, the solution becomes more viscous due to polymerization induced by the salt.

It is therefore a general object of the present invention to provide an improved process for polymerizing acrylic monomers.

Another object of the present invention is to provide a process for prepolymerizing an acrylic monomer whereby the polymerizable fluid will be composed of both a fuel and an oxidizing agent.

Still another object of the present invention is to provide a process for controlling the degree and rate of polymerization of an acrylic monomer.

Other objects and advantages of the present invention will be readily appreciated as the same becomes better understood by reference to the following description.

It has been found that strontium perchorate containing up to 4 percent of water will dissolve in acrylic monomers, such as the esters of acrylic and methacrylic acids. At room temperature, about 18 parts of strontium perchlorate will dissolve in 100 parts of methyl methacrylate monomer. It has been discovered, however, that the degree of solubility is related to the amount of moisture contained in the oxidant. Maximum solubility occurs when about 2.2 percent of moisture is present in the oxidant. Upon mixing the desired amount of oxidant with the acrylic monomer, a prepolymer is readily formed, accompanied by heat evolution. This results in an increase in viscosity of the mixture. This reaction occurs without the need of an organic catalyst, and if the process is not regulated as to the degree of solubility and temperature, a hard polymeric mass will be formed.

In order to obtain information concerning the effect of the amount of water in strontium perchlorate on its solubility in an acrylic monomer, a number of samples were prepared using different moisture contents. Strontium perchlorate was prepared by adding water until the desired moisture concentration was obtained. The moistened salt was then added to 25 ml. of monomer (methyl methacrylate) while a temperature of 25 degrees C. was maintained. An excess of salt was added and the temperature was raised to 30 degrees C. in order to dissolve the excess salt. The temperature was then reduced to 25 degrees C. in order to crystalize the excess salt from the solution. The results are listed in Table I. It should be noted that maximum solubility occurs when the percentage of water present is about 2.2 percent.

TABLE I

| No. | Methyl Monomer (grams) | Water (grams) | Anhydrous Strontium Perchlorate Dissolved | Water (percent) |
|---|---|---|---|---|
| 1 | 23.38 | 0.0 | 4.70 | 0.0 |
| 2 | 23.38 | 0.08 | 8.23 | 1.0 |
| 3 | 23.38 | 0.55 | 24.47 | 2.2 |
| 4 | 23.38 | 0.55 | 24.51 | 2.2 |
| 5 | 23.38 | 0.44 | 17.12 | 2.5 |
| 6 | 23.38 | 0.40 | 12.04 | 3.2 |
| 7 | 23.38 | 0.52 | 12.44 | 4.0 |

In order to show the activating effect that strontium perchlorate has on an acrylic monomer, a number of samples were prepared using different amounts of the salt. A reagent grade anhydrous strontium perchlorate was used to which water was added to provide about 2.2 percent moisture. Varying amounts of the salt were dissolved in each of 25 ml. of monomer (methyl methacrylate inhibited with 25 p.p.m. hydroquinone). After the strontium perchlorate was dissolved, ½ ml. of cumene hydroperoxide catalyst was added. The activated and catalyzed solution was then heated in an oven at 85 degrees C. and the time to effect polymerization was recorded. The results are shown in Table II. Sample number 8, containing only the ½ ml. of cumene hydroperoxide as a catalyst was prepared as a control sample. Sample number 8 did not contain any strontium perchlorate and required approximately 4 hours to polymerize. By comparison, sample number 9, which contained only about 2.5% of moistened strontium perchlorate, was polymerized in about 66 minutes. The magnitude of the polymerization time reduction caused by the relatively small amount of oxidant is one of the significant features of the present invention.

TABLE II

| No. | Methyl Monomer (grams) | Anhydrous Strontium Perchlorate (grams) | Water (grams) | Moistened Strontium Perchlorate (grams) | Time to Polymerize (min.) |
|---|---|---|---|---|---|
| 8 | 23.38 | 0.0 | 0.0 | 0.0 | 243 |
| 9 | 23.38 | 0.59 | 0.01 | 0.60 | 66 |
| 10 | 23.38 | 1.21 | 0.02 | 1.23 | 51 |
| 11 | 23.38 | 2.54 | 0.06 | 2.60 | 29 |
| 12 | 23.38 | 4.11 | 0.09 | 4.20 | 18 |
| 13 | 23.38 | 7.62 | 0.17 | 7.97 | 14 |
| 14 | 23.38 | 22.87 | 0.51 | 23.38 | 10 |

While the samples listed in Table II were catalyzed with cumene hydroperoxide, there are many more commonly known catalysts that promote polymerization of acrylic monomers. Included among the known catalysts are diacyl peroxides, ketone peroxides, alkyl hydroperoxides, aralkyl hydroperoxides, alkyl peresters, and alkyl acid peresters. Various effects can be obtained by the use of different catalysts and also combination of catalysts can produce effects not readily available with any single catalyst.

While Tables I and II each show the relationship of various samples of methyl methacrylate and strontium perchlorate, strontium perchlorate also exhibits similar characteristics as shown in Tables I and II, when mixed in solution with acrylic acid, methacrylic acid, and esters of acrylic acid and methacrylic acid, such as methyl acrylate and ethyl acrylate. Samples were prepared in which about 21 gms. of strontium perchlorate, moistened with about ½ gm. of water, was added to each of 25 ml. of acrylic acid monomer, methacrylic acid monomer, and various esters of acrylic and methacrylic acid. To each of the mixtures about ½ ml. of cumene hydroperoxide catalyst was added, and with each sample the polymerization time was reduced from an excess of 5 hours to less than 10 minutes. As in the samples using methyl methacrylate, the moisture content in the strontium perchlorate affects the solubility in the monomer.

It can thus be seen that strontium perchlorate acts both as an activator and a catalyst, that is, small amounts of strontium perchlorate, when added to an acrylic monomer, will shorten the induction time normally required to polymerize the monomer, and also the temperature required to polymerize the monomer is less. When the strontium perchlorate dissolves in the monomer, there is provided a fluid which serves both as a fuel and an oxidizing agent. This fluid, when polymerized, serves as an excellent binder for use in pyrotechnics and rocket propellants.

Obviously many modifications and variations of the present invention are possible in the light of the above teachings. It is therefore to be understood, that within the scope of the appended claims, the invention may be practiced otherwise than as specifically described.

What is claimed is:

1. A process for preparing a polymer from at least one monomer from the class consisting of acrylic acid, methacrylic acid, and esters of acrylic acid and methacrylic acid comprising:

first dissolving water moistened strontium perchlorate with a said monomer in the ratio of between .025 to .23 part, by weight, of strontium perchlorate per one part of monomer, and then catalyzing the solution of moistened strontium perchlorate and monomer whereby said monomer is polymerized in a relatively short time.

2. A process for preparing a polymer as set forth in claim 1 wherein said solution is catalyzed with a polymerization catalyst selected from the group consisting of diacyl peroxides, ketone peroxides, alkyl hydroperoxides, aralkyl hydroperoxides, and alkyl peresters.

3. A process for preparing a polymer as set forth in claim 1 wherein said solution is catalyzed with cumene hydroperoxide.

4. A process for preparing a polymer as set forth in claim 1 wherein said strontium perchlorate is moistened with between 0.1 and 4 parts, by weight, of water per one hundred parts of strontium perchlorate.

References Cited

UNITED STATES PATENTS 3,236,705    2/1966    Gilman et al. _____ 149—19

BENJAMIN R. PADGETT, *Primary Examiner.*